Oct. 4, 1966   D. S. RICHART   3,277,042
PLASTICIZED VINYL CHLORIDE RESIN CONTAINING ETHYLENE-ETHYL
ACRYLATE COPOLYMER AND ARTICLE COATED THEREWITH
Filed June 4, 1963
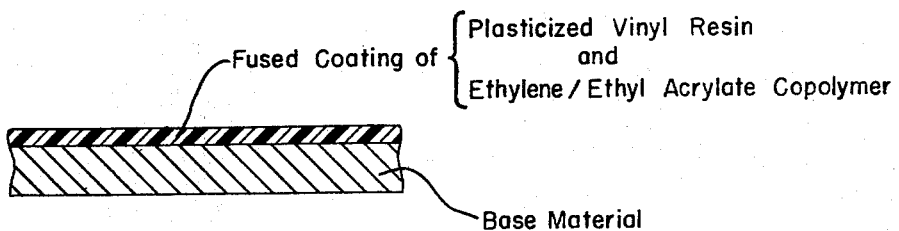
FIG. I
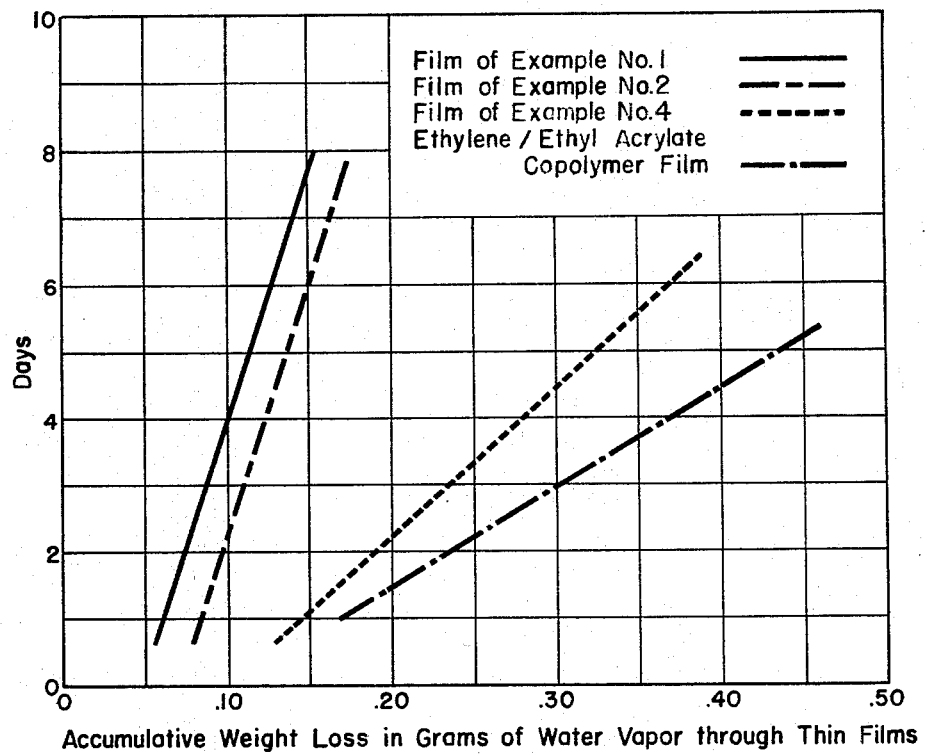
FIG. 2
INVENTOR
DOUGLAS S. RICHART
BY
ATTORNEY

# 3,277,042
PLASTICIZED VINYL CHLORIDE RESIN CONTAINING ETHYLENE-ETHYL ACRYLATE COPOLYMER AND ARTICLE COATED THEREWITH Douglas S. Richart, Wyomissing, Pa., assignor, by mesne assignments, to The Polymer Corporation, a corporation of Pennsylvania
Filed June 4, 1963, Ser. No. 285,427
12 Claims. (Cl. 260—31.8)

This invention relates to novel vinyl chloride polymer compositions. More particularly, this invention relates to vinyl chloride polymer coating compositions containing an ethylene/ethyl acrylate copolymer which imparts improved blister resistance and durability thereto.

Vinyl coating compositions, including those based on homopolymers as well as copolymers of vinyl chloride are widely used in industry today. Their use, however, is not without problems or limitation. One problem, and one which this invention overcomes, is the tendency of vinyl chloride coating compositions to blister and fail under conditions of high moisture vapor humidity and moderate to high temperatures. This is particularly troublesome where a temperature gradient exists across a substrate, as where one side is exposed to high temperature and humidity and the other side is exposed to ambient or room temperature conditions. Such conditions can arise, for example, in applications such as dishwasher tubs, laundry tubs, tanks and in other similar apparatus where the inside thereof contains a hot fluid, usually water or some aqueous solution, and the outside of the tank is at room temperature and exposed to the air.

It is therefore, an object of this invention to provide a new and novel vinyl chloride polymer coating composition. It is a further object of this invention to provide a new vinyl chloride polymer composition useful for producing protective coatings with improved resistance to blistering. It is also an object of this invention to provide a vinyl chloride polymeric coating having improved resistance to blistering and improved durability under conditions of high temperature and humidity when used with varying types of substrates. A further object is to provide articles coated with this new composition. Other objects and advantages of the invention will be apparent from the following detailed description.

The coating compositions of the present invention are in the form of dry free-flowing powders, having a particle size predominantly in the range of about 25 to 400 mesh (U.S. Sieve Series). They are comprised essentially of a plasticized vinyl chloride polymer or resin in intimate admixture with an ethylene/ethyl acrylate copolymer, and are adapted to form a protective and/or decorative coating or non-tacky durable layer on metallic substrates, for example, iron, steel, aluminum, etc., or on non-metallic substrates, for example, ceramics, glass, etc. by a fusion process. The term "fusion process" (or "fusion coating process") is taken to mean any process in which the coating composition is applied to the surface to be coated, in the form of finely-divided solid particles or dry powders, which particles or powders are fused, sintered, or melted either as they approach the surface to be coated or after they come into contact with a preheated surface and are deposited thereon with resultant formation of a coating or adherent layer on the substrate surface. Examples of such "fusion process" or "fusion coating process" are, coating of a preheated surface by contacting with a fluidized bed of the coating powder, see for example U.S. Patent 2,844,489; contacting of a preheated surface with non-fluidized powder; blowing or sifting the powdered film-forming composition on a preheated surface; using a hot gas stream to project the particles on a surface which may or may not be preheated; tumbling an article which is heated with the powders, and many others. The coating applied by the fusion coating process will be from about 1 to 30 mils in a single operation and considerably thicker coatings can be obtained by repeating the operation.

The surfaces to be coated may or may not be pretreated, as by degreasing, sand-blasting, acid-etching, phosphating or "bonderizing," etc. It may also be desirable to prime the surface to be coated with any of a number of conventional primers. Liquid, epoxy/acrylic type primers may be used, for example, the primers disclosed in U.S. Patents 3,008,848 and 3,057,746, as well as many others. Generally, a more adherent coating is achieved with proper pretreatment of the substrate surface, but not necessarily a more blister resistant coating, and thus, it is to be understood that the advantages of this invention are obtained in any event and are not dependent upon any particular surface pretreatment.

The vinyl chloride polymers or resins useful in preparing the compositions of this invention include the homopolymer of vinyl chloride, i.e., polyvinyl chloride, as well as copolymers of vinyl chloride with other monoethylenically unsaturated monomers wherein the copolymer contains at least 75% by weight of vinyl chloride units. The materials to be copolymerized with the vinyl chloride may be exemplified by vinyl acetate, diethyl fumarate, methacrylonitrile, acrylonitrile, styrene, vinylidene, chloride, allyl alcohol, ethyl vinyl succinate, allyl ethyl phthalate, vinyl benzoate, allyl acetate and the like, etc. Also, mixtures of one or more copolymers or mixtures of the homopolymer with one or more copolymers may be used, for example, a mixture of polyvinyl chloride and polyvinyl acetate. The vinyl polymers or resins may be of low, medium and high molecular weight. Thus, vinyl polymers or resins having molecular weights of about 15,000 to 200,000, and more preferably from about 25,000 to 150,000 may be used.

While it is necessary that the vinyl chloride polymers be plasticized in practicing this invention, the specific amount and type of plasticizer may vary over wide limits. A practical but important lower limit sufficient to enable flow out of the coating composition under atmospheric pressure is about 15 parts and more preferably about 20 parts of plasticizer per 100 parts of vinyl chloride polymer or resin. The upper limit is not critical and is determined only by that minimum amount of plasticizer which would cause the composition to be altered from a free-flowing powder to one which is sticky or soupy and non-free-flowing at room temperature. Ordinarily, the upper limit will not exceed 100–125 parts of plasticizer per 100 parts of vinyl resin.

Illustrative of suitable plasticizers for the vinyl chloride polymers or resins are di-2-ethylhexyl adipate, n-octyl n-decyl phthalate, diethylene glycol dibenzoate, tricresyl phosphate, dioctyl sebacate, di(2-ethylhexyl) phthalate (generally referred to as dioctyl phthalate), di (2-amyl) phthalate, diisooctyl phthalate, acetyl tributyl citrate, and polyesters and epoxidized polyesters prepared from fatty acids with dibasic acids, as well as many others.

The ethylene/ethyl acrylate copolymer resins useful in this invention are normally solid materials containing at least about 2 percent by weight combined ethyl acrylate and not in excess of about 25 percent by weight combined ethyl acrylate and have densities of from about 0.915 to 0.94 gram per cc. at 23° C. The copolymer consists of units represented by the formulae:

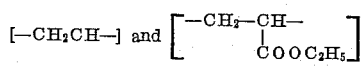

wherein the structure of said copolymer is predominantly a series of long chains of [—CH$_2$CH$_2$—] units with each chain of [—$CH_2CH_2$—] units connected to another chain thereof by a

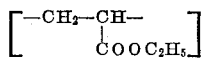

group containing from one to about five of said

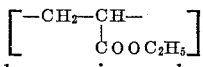

units. These copolymer resins can be made according to the teachings of White, U.S. Patent 2,953,551. A preferred ethylene/ethyl acrylate copolymer resin for use in the present invention and made according to the teachings of the aforementioned White patent is one having a density of 0.931 gram/cc. at 23° C. (ASTM test D1505–57T) and a melt index of 6 gms./10 min. (ASTM test D1238–52T). Improved results are noted when about 10 parts to about 50 parts of the ethylene/ethyl acrylate copolymer are used per 100 parts of the vinyl chloride resin, with a more preferred range being 20 to 40 parts per 100 parts of vinyl chloride resin, all references to parts being by weight.

An accelerated test that is widely accepted for determining blister formation is known as the "hot/cold" vapor test. This test consists of affixing test panels to the side of a test tank comprising a closed chamber containing a mass of water heated to 200° F. One side of the test panel is exposed to ambient room temperature conditions, while the other side is exposed to an atmosphere of water vapor in equilibrium with water at 200° F. This test is quite severe and causes most coating materials to blister within several days.

In the following examples, steel panels, approximately 3″ x 5″ x 1/16″, were cleaned, bonderized and primed. Coatings were applied to these panels by preheating them to approximately 625° F. for 3–5 minutes and then dipping them in the dense phase of a fluidized bed of the following, dry, free-flowing powdered coating compositions followed by a 30 second postheat in an oven at 500° F. The coated panels were then tested for blister resistance in the aforementioned "hot/cold" vapor test. For convenience the results obtained are tabulated below. (The amounts given are all in parts by weight unless otherwise indicated.)

TABLE 1

| Example | 1 | 2 | 3 | 4 | 5 | 6 | 7 | 8 |
|---|---|---|---|---|---|---|---|---|
| Polyvinyl chloride [1] | 100 | 100 | 100 | 100 | 100 | 100 | 100 | |
| Polyvinyl chloride [2] | | | | | | | | 100 |
| Dioctyl Adipate | 15 | 15 | 15 | 15 | | | | |
| Di-2-ethylhexyl phthalate | | | | | 40 | 40 | 40 | |
| n-Octyl, n-decyl phthalate | 20 | 20 | 20 | 20 | | | | 55 |
| Drapex 4.4 [3] | 10 | 10 | 10 | 10 | | | | |
| Ethylene/ethyl acrylate copolymer | | 20 | 30 | 40 | 10 | 25 | 40 | 25 |
| $TiO_2$ | 10 | 10 | 10 | 10 | | | | |
| Tribase [4] | 8 | 8 | 8 | 8 | 8 | 8 | 8 | 8 |
| Blister Resistance to water vapor at 200° F., days until first observable blisters appear | 1 | 2 | 4 | [5] 15 | 2 | 5 | [5] 27 | 8 |

[1] Low molecular weight vinyl resin having a specific viscosity of 0.31, a specific gravity of 1.4 and a particle size 100% through 40 mesh.
[2] Medium molecular weight vinyl resin having a specific viscosity of 0.54, a specific gravity of 1.4 and a particle size 99% through 100 mesh.
[3] Trade name of Argus Chemical Co. for the stabilizing plasticizer, octyl epoxy tallate.
[4] Trade name of National Lead Co. for tribasic lead oxide.
[5] Test discontinued after number of days given in table without any observable blisters appearing.

As can be seen from Table 1, a marked improvement in blister resistance is evidenced upon the addition and use of the ethylene/ethyl acrylate copolymer. Example 1 shows that without the ethylene/ethyl acrylate polymer, the coating composition blisters in one day. Examples 2 thru 8 show that improved results are obtained when about 10 parts of the ethylene/ethyl acrylate copolymer per 100 parts of vinyl resin are added to the coating composition and that the improvements are noted whether the system is pigmented or unpigmented ($TiO_2$ being used as merely exemplary of many pigments and fillers that could be used) and with a variety of plasticizers. Example 8 shows that the same results are obtained with medium to high molecular weight vinyl resin.

In the above examples, the formulations were prepared by compounding and milling the ingredients shown in the examples of Table 1 on a two roll mill. In each case, the intimately mixed product thus obtained was chilled, ground and screened to pass through a 50 mesh screen.

For using the compositions of the present invention in a fluidized bed coating operation, it is preferred to dry blend into the compositions a small amount of a "paste grade" vinyl resin (having a particle size of 5 microns or below) in order to improve the fluidizing properties of the pulverulent material, in accordance with the teachings of co-pending application of Gruber and Haag, Serial Number 799,122, filed March 13, 1959.

The composition of the present invention may also contain, usually in minor amounts, conventional stabilizers, antioxidants, fillers, pigments, etc. The tribase stabilizer used in Examples 1–8, is merely one of many known and conventional vinyl stabilizers conveniently available today which may be used. Similarly, the $TiO_2$ pigment and filler is just one of many that could be used.

FIGURE 1 shows a section of a coated article with a base material of metal or non-metal having a heat fused or sintered coating of a plasticized vinyl chloride resin and ethylene/ethyl acrylate copolymer. It is understood that in accordance with the description hereinabove given the base material may be phosphated for underfilm corrosion purposes, and that an intermediate primer layer may also be interposed between the coating and substrate, if desired.

FIGURE 2 illustrates the accumulative weight loss of moisture in grams through thin films of various representative compositions indicated (Examples 2 and 4); a control, i.e., Example 1; and of the ethylene/ethyl acrylate copolymer used in Table I. A Payne cup, the standard device used for measuring water vapor transmission, was employed. Permeability tests were run at 23° C. Relative humidity was 100% in the cup and zero outside the cup. It is noted that the film of the ethylene/ethyl acrylate copolymer is much more permeable than the film formed from Example 1 (containing no ethylene/ethyl acrylate copolymer) and that increasing amounts of ethylene/ethyl acrylate copolymer, cf. Examples 2 and 4, increase the vapor transmission characteristics or permeability of the plasticized vinyl chloride resin films.

A surprising and unexpected effect, apparent from an inspection of FIGURE 2 and Table I, is that improved blister resistance can be obtained by the use of a permeability promoting agent, in this instance, the ethylene/ethyl acrylate copolymer. This is in contrast to the prior art approach of making the coating or film as impermeable or vapor resistant as possible in order to improve blister resistance. The permeability promoting agent is believed to function by establishing an equilibrium condition which favors the transmission of water vapor back out of the film or coating as fast as or almost as fast as it comes into and through the film or coating. In the case of a substantially impermeable coating or film, water vapor which is of very small molecular size, still manages to some extent to get into and through the film, but in this case the water vapor collects and condenses at the interface and since it cannot readily get back out through the film or coating, blisters result.

With further reference to FIGURE 2, calculations of specific permeability, in mg. $H_2O$/sq. cm./24 hrs./mm. thickness, gave values of 17.5 for the ethylene/ethyl acrylate copolymer, 8.6 for the film of the composition of Example 4, 7.1 for the film of the composition of Example 2, and 5.1 for the film of the composition of Example 1.

The compositions of the present invention find utility in the coating of many different types and varieties of articles. They have particular utility in the coating of articles which in actual use have one or more surfaces exposed to room temperature conditions while other surfaces are exposed to high humidity and temperature condition, for example, dishwasher tubs, laundry tubs, tanks, etc. They may be to good advantage, however, used for coating other articles, for example, barrels, pipes and tubing, wires, sheet, machine parts, structural parts, etc.

Obviously, many modifications and variations of the present invention are possible in the light of the above teachings. It is to be understood, therefore, that the scope of the invention is not limited by the details of the foregoing description but will be defined in the following claims.

I claim as my invention:

1. A dry, free-flowing, pulverulent coating composition comprising a vinyl chloride resin in intimate admixture with an ethylene/ethyl acrylate copolymer and at least 15 parts by weight of a plasticizer for said resin per 100 parts by weight of said resin.

2. A dry, free-flowing, pulverulent coating composition for producing by a fusion coating process a blister-resistant coating on a substrate surface, said composition comprising a vinyl chloride resin in intimate admixture with an ethylene/ethyl acrylate copolymer and at least 15 parts by weight of a plasticizer for said resin per 100 parts by weight of said resin.

3. A coating composition in the form of a dry, free-flowing powder, said composition comprising in intimate admixture, (1) a vinyl chloride resin selected from the group consisting of homopolymers and copolymers of vinyl chloride and mixtures thereof, (2) at least 20 parts by weight of a plasticizer per 100 parts by weight of vinyl chloride resin, and (3) about 10–50 parts by weight per 100 parts by weight of vinyl chloride resin of an ethylene/ethyl acrylate copolymer.

4. The coating composition of claim 3 in which the ethylene/ethyl acrylate copolymer has a density of from 0.915 to 0.94 gram per cc. at 23° C.

5. The fused product of the composition of claim 4.

6. The coating composition of claim 3 in which the ethylene/ethyl acrylate copolymer has a density of 0.931 gram per cc. at 23° C. and a melt index of 6 grams/10 minutes.

7. The fused product of the composition of claim 6.

8. In the coating of articles with a plasticized vinyl chloride resin composition by a fusion coating process, the improvement which comprises intimately premixing an ethylene/ethyl acrylate copolymer and at least 15 parts by weight of a plasticizer for said resin per 100 parts by weight of said resin with the vinyl chloride resin and using the admixture in the fusion coating process.

9. An article having a fused, plasticized, vinyl chloride resin coating, said coating containing an ethylene/ethyl acrylate copolymer and at least 15 parts by weight of a plasticizer for said resin per 100 parts by weight of said resin.

10. A coated article comprising a substrate and a coating thereon, said coating comprising the fused product of an intimate mixture of polyvinylchloride, an ethylene/ethyl acrylate copolymer and at least 15 parts by weight of a plasticizer for said resin per 100 parts by weight of said resin.

11. The article of claim 10 in which the polyvinylchloride has a molecular weight of from about 25,000 to 150,000 and the ethylene/ethyl acrylate copolymer, before fusing, contains at least about 2 percent by weight combined ethyl acrylate and not in excess of about 25 percent by weight combined ethyl acrylate.

12. A method for improving the vapor transmission of a vinyl chloride coating resin, having at least 15 parts by weight of a plasticizer for said resin per 100 parts by weight of said resin, which comprises adding from about 10 to about 50 parts by weight per 100 parts of said resin of an ethylene/ethyl acrylate copolymer.

References Cited by the Examiner

UNITED STATES PATENTS 3,062,778   6/1963   Van Cleve et al. _____ 260—897

MURRAY TILLMAN, *Primary Examiner.*

DONALD E. CZAJA, *Examiner.*

J. A. KOLASCH, E. B. WOODRUFF,
*Assistant Examiners.*